Patented Mar. 14, 1950

2,500,576

UNITED STATES PATENT OFFICE 2,500,576

PRODUCTION OF 7-DEHYDROSTEROLS

William L. Ruigh, Summit, N. J., assignor to Nopco Chemical Company, Harrison, N. J., a corporation of New Jersey No Drawing. Application December 24, 1947, Serial No. 793,757

12 Claims. (Cl. 260—397.2)

This invention relates to the production of dehydrosterols and, more particularly, to an improved process for the production of 7-dehydrosterols.

In British patent specification No. 574,432 there is disclosed a process for the production of 7-dehydrosterols wherein sterol esters are halogenated with a suitable N-halogenated acid amide or imide after which the halogenated ester is dehydrohalogenated to produce the corresponding 7-dehydrosterol ester. The 7-dehydrosterol ester is then separated from the dehydrohalogenation reaction mixture by either admixing the reaction mixture with an excess of an aqueous acid solution, e. g., an aqueous 10% hydrochloric acid solution, and extracting the resulting mixture with a solvent such as ether or a hydrocarbon solvent, e. g., petroleum ether, to extract the 7-dehydrosterol ester from the aqueous mixture; or the dehydrohalogenation reaction mixture is dissolved in an excess of a water-immiscible solvent such as petroleum ether, and the resulting solvent solution then extracted with an aqueous acid solution, e. g., an aqueous 10% hydrochloric acid solution, to remove the dehydrohalogenating agent from the solvent solution. The solvent solution containing the 7-dehydrosterol ester is then in each case washed with a dilute alkali solution, e. g., a 10% sodium carbonate solution, to remove any acid dissolved in the solvent, and thereafter the solvent solution is washed with water to remove any alkali dissolved in the solvent. The solvent is then evaporated to obtain the 7-dehydrosterol ester. The free sterol is obtained by saponification of the 7-dehydrosterol ester.

French Patent No. 901,551 which discloses a process for producing 7-dehydrosterols which is essentially the same as the process of the above-identified British patent utilizes essentially the same procedure as is employed in the British patent to separate the 7-dehydrosterol ester from the dehydrohalogenation reaction mixture.

Such methods of separating a 7-dehydrosterol ester from a dehydrohalogenation reaction mixture are cumbersome, very time consuming, and frequently result in a considerable loss of valuable 7-dehydrosterol ester through the formation of intractable emulsions as the separation of the various phases during the different extractions is far from being 100% effective. In general, the procedures based on extractions with immiscible solvents increase the cost of and complicate the overall process for producing the 7-dehydrosterol.

It is the object of this invention to provide a highly improved process for recovering 7-dehydrosterol esters from dehydrohalogenation reaction mixtures.

A further object of the invention is to provide a process for recovering 7-dehydrosterol esters from dehydrohalogenation reaction mixtures which is simpler and more efficient than prior art processes.

Other objects of the invention will in part be obvious and will in part appear hereinafter.

I have discovered that the above and other objects of the invention may be accomplished if the dehydrohalogenation reaction mixture after completion of the dehydrohalogenation reaction, instead of being treated in accordance with the prior art processes to recover 7-dehydrosterol esters, is dissolved in an excess of a solvent selected from the group consisting of aliphatic alcohols, ketones and esters containing five or less carbon atoms, the resulting solution cooled to a temperature somewhat below room temperature and the material which separates from the solution at the low temperature removed therefrom. This material which separates from the solvent solution at the low temperature will be the desired crude 7-dehydrosterol ester.

The purity of the crude 7-dehydrosterol esters obtained by the process of my invention is almost invariably considerably higher than the purity of products recovered by prior art processes. Furthermore, the yield of 7-dehydrosterol esters obtained by the process of my invention is usually somewhat higher than that obtained with the prior art processes. Also, the process of my invention is much simpler in operation since in the prior art processes several extractions of one liquid with another immiscible therewith must be made, and the crude 7-dehydrosterol ester then recovered by distilling off the solvent in which it is dissolved, whereas in my process the dehydrohalogenation reaction mixture is simply dissolved in an excess of solvent, cooled to low temperature and filtered or centrifuged to obtain the desired 7-dehydrosterol ester.

Solvents suitable for use in the process of my invention are the aliphatic alcohols, aliphatic ketones and aliphatic esters which contain five or less carbon atoms. As examples of such solvents there may be mentioned, inter alia, methanol, ethanol, propanol, isopropanol, butanol, acetone, methyl ethyl ketone, diethyl ketone, methyl acetate, ethyl acetate, isopropyl acetate, etc. Mixture of such solvents may also be employed if desired; thus acetone and methanol mixed in any desired proportion will give excellent results in the process of my invention. If desired, up to 15% of water may be incorporated into the particular solvent which is employed in the process of the invention provided, of course, that the solvent is miscible with water to that extent. If the amount of water which is miscible with the solvent is less than 15%, then the maximum amount of water which is miscible therewith will, of course, be the maximum amount that would be incorporated therein.

The quantity of solvent employed should be at least equal in volume to the volume of the dehydrohalogenation reaction mixture. Preferably I employ a volume of solvent equal to from two to five times the volume of the dehydrohalogenation reaction mixture, and larger quantities may be employed. The phrase "in an excess of" is used in the claims with reference to the solvent in which the dehydrohalogenation reaction mixture is dissolved to indicate that the volume of solvent which is employed is at least slightly greater than the volume of the dehydrohalogenation reaction mixture.

If desired, a small amount of activated carbon may be admixed with the dehydrohalogenation reaction mixture when the solvent is admixed therewith. Then the activated carbon may be removed from the mixture by filtration whereupon it will be found that the greater part of any undesirable coloring matter in the reaction mixture will have been removed by the activated carbon.

The solvent solution containing the dehydrohalogenation reaction mixture is cooled to a temperature somewhat below room temperature, e. g., 10° C. or below and preferably to 0° C. or below, whereupon the 7-dehydrosterol ester will separate therefrom, usually in a crystalline form. The 7-dehydrosterol ester may then be readily recovered by merely filtering or centrifuging the mixture. If desired either or both the solvent and the dehydrohalogenation reaction mixture may be cooled somewhat, prior to being admixed. If they are both cooled to a temperature somewhat below room temperature before the admixture, the 7-dehydrosterol ester will not dissolve in the solvent although the remainder of the dehydrohalogenation reaction mixture will do so. Consequently the 7-dehydrosterol ester may thereupon be recovered merely by filtration or centrifugation of the solvent solution of the dehydrohalogenation reaction mixture. In most cases, it is preferred, although not necessary, to have both the solvent and the dehydrohalogenation reaction mixture at a temperature equal to at least about room temperature when they are admixed, and if desired both the solvent and the dehydrohalogenation reaction mixture may be at a temperature of 50° C. or above when they are admixed. The word "hot" when used in the claims with reference to the solvent and the dehydrohalogenation reaction mixture indicates that they are at a temperature of at least about 50° C.

As has been pointed out above, the purity of the 7-dehydrosterol esters obtained by the process of my invention is usually considerably higher than the purity of products recovered by the prior art processes. Furthermore, the yield of the 7-dehydrosterol ester is usually somewhat higher when my process is employed than when the prior art processes are employed. The most important advantage of my process, however, is its ease and simplicity of operation as compared to the cumbersome extraction procedures of the prior art.

The process of my invention is applicable to the recovery of any 7-dehydrosterol ester from any dehydrohalogenation reaction mixture. My process is particularly applicable to the recovery of 7-dehydrosterol esters produced in the process described in my copending application Serial No. 765,631, filed August 1, 1947. The process disclosed in that application is somewhat similar to the processes disclosed in the British and French patents referred to hereinabove; however, during the halogenation step of that process a peroxide catalyst is employed since by so doing I have found that the yield of the 7-dehydrosterol ultimately obtained will be greatly increased. Dehydrohalogenation reaction mixtures obtained in that process are particularly well adapted to being treated by the process of the present invention to recover the 7-dehydrosterol esters therein.

For a fuller understanding of the nature and objects of the invention, reference may be had to the following examples which are given merely to further illustrate the invention and are not to be construed in a limiting sense.

*Example I*

200 grams of recrystallized cholesteryl acetate were dissolved in 800 ml. of hot anhydrous, distilled hexane. To the solution there was added 0.565 gram of benzoyl peroxide and the mixture stirred with heating to dissolve the catalyst. Then 106 grams of 97.1% N-bromosuccinimide were added and the mixture heated on a steam bath with stirring. Within a few minutes a vigorous reaction set in which was controlled by intermittently turning off the steam. The reaction mixture was heated for a total of about 20 minutes.

The reaction mixture was then cooled to about 55° C. and filtered to remove the succinimide which had been formed. The succinimide was washed with two 50 ml. portions of hexane, and the combined filtrate and washings were added to 300 ml. of crude diethylaniline. The hexane was distilled off in vacuo, and the remaining solution heated at about 90–95° C. in vacuo ($N_2$ atm.) for 3 hrs. with stirring to dehydrohalogenate the halogenated cholesteryl acetate.

The dehydrohalogenation reaction mixture was then cooled to 75° C. and 1100 ml. of hot denatural ethanol added along with 10 grams of activated carbon. The mixture was stirred at 75° C. for 10 minutes ($N_2$ atm.) and filtered using 100 ml. of hot denatured ethanol for washing the material which was filtered off. The combined filtrate was chilled to 5° C. with stirring in an ice bath and then chilled to −15° C.

The crude, granular 7-dehydrocholesteryl acetate was filtered off at −15° C. and then washed with cold (−15° C.) denatured ethanol. The yellowish-brown, sticky solid was dried in a vacuum drier at 105° F. for 3 hrs. giving 161 grams of material. A spectroscopic analysis of the crude 7-dehydrocholesteryl acetate showed the following:

44.5% purity
36.0% yield from cholesteryl acetate

*Example II*

200 grams of cholesteryl acetate were treated by essentially the same process employed in Example I with the exception that the benzoyl peroxide was replaced with 0.930 grams of lauroyl peroxide. The crude 7-dehydrocholesterol acetate recovered from the ethanol solution of the dehydrohalogenation reaction mixture by cooling and filtration thereof amounted to 142.5 grams of a yellowish-brown, sticky solid. The product obtained had a purity of 50.0%, thus giving a yield of 7-dehydrocholesterol acetate of 35.8%.

*Example III*

100 grams of cholesteryl benzoate were halogenated with N-bromosuccinimide employing benzoyl peroxide as a catalyst and utilizing essentially the same procedure as in the previous examples. The halogenated material was dehydrohalogenated with 200 ml. of diethylaniline as in the previous examples, and the dehydrohalogenation reaction mixture was then dissolved in 5 volumes (1 liter) of hot methanol. The resulting mixture was stored overnight at 0° C., then filtered and the material which was filtered off washed with cold pentane, cold methanol, and again with cold pentane. The product after drying in vacuo weighed 75.4 grams. Spectroscopic analysis showed that the product had a purity of 43.0%, thus giving a yield of 32.5% from the cholesteryl benzoate.

*Example IV*

200 grams of recrystallized cholesteryl acetate were halogenated with N-bromosuccinimide as in the previous examples, employing benzoyl peroxide as the catalyst. Dehydrohalogenation of the halogenated material was likewise carried out as in the previous examples. When the dehydrohalogenation reaction was completed, the reaction mixture weighed 523 grams. The dark-brown material was thoroughly mixed and then divided into five equal portions—$a$, $b$, $c$, $d$, and $e$.

The various fractions were dissolved in hot solvents as follows:

$a$—240 ml. of methanol
$b$—192 ml. of methanol+48 ml. of acetone
$c$—144 ml. of methanol+96 ml. of acetone
$d$—96+144 ml. of acetone
$e$—48+192 ml. of acetone Each fraction was stirred with chilling in ice to precipitate the 7-dehydrocholesteryl acetate, and then each fraction was stored at −15° C. overnight. The various fractions were filtered at −15° C., the crude 7-dehydrocholesteryl acetate which was filtered off was washed in each case with cold (−15° C.) methanol, and then each sample of the crude acetate was dried in a vacuum drier at 80° F. for 3 hours. The following amounts of crude 7-dehydrocholesteryl acetate were obtained: $a$—43.6 grams; $b$—37.2 grams; $c$—24.8 grams; $d$—19.5 grams; and $e$—25.7 grams. Spectroscopic analysis of the different crude products gave the following results:

|  | Purity | Yield from Cholesteryl Acetate |
| --- | --- | --- |
|  | Per cent | Per cent |
| $a$ | 36.2 | 39.7 |
| $b$ | 41.75 | 39.1 |
| $c$ | 53.5 | 33.4 |
| $d$ | 62.4 | 30.7 |
| $e$ | 48.75 | 31.6 |

*Example V*

One hundred grams of cholesteryl benzoate were dissolved in 6.5 volumes (650 ml.) of hot hexane. The solution was cooled to about 60° C. and 43.8 grams (1.2 equiv.) of powdered 99.3% N-bromosuccinimide were added. The mixture was refluxed with stirring for thirty minutes at the end of which time the mixture contained little active bromine. The hot solution was filtered with suction and the precipitate washed with hexane. The crude succinimide obtained amounted to 24.17 grams which represented a recovery of 98.6%. The filtrate was then mixed with two volumes (200 ml.) of diethylaniline and concentrated in vacuo ($CO_2$ atm.) until the hexane had been distilled off. The residual solution was then stirred and heated at about 95° C. for two and one-half hours ($CO_2$ atm.). The hot solution was taken up in a little methanol to dissolve a small amount of diethylaniline hydrobromide which had formed. This brought the volume of the mixture up to 330 ml. The mixture was then divided into two equal fractions of 165 ml. each, fraction A and fraction B.

Fraction A was treated in accordance with the processes of the prior art to recover the 7-dehydrocholesteryl benzoate. It was first dissolved in an excess of hexane, and then the hexane solution was washed with a 5% HCl solution until free of diethylaniline. The hexane solution was then washed with a 10% $K_2CO_3$ solution, and finally the solution was washed with water until neutral. The hexane was then evaporated from the hexane solution leaving a residue of 53.3 grams of crude 7-dehydrocholesteryl benzoate. A spectroscopic analysis of the crude material showed a purity of approximately 20%, thus giving a yield of 21.7% from the cholesteryl benzoate.

Fraction B was treated by the process of the present invention to recover the 7-dehydrocholesteryl benzoate. The fraction was dissolved in 500 ml. of hot methanol and the resulting solution cooled to −17° C. overnight. The precipitate which was obtained was filtered off from the mixture, washed with cold pentane and dried in vacuo to give 24.84 grams of crude 7-dehydrocholesteryl benzoate. A spectroscopic analysis of the crude material showed that it had a purity of 54.4% thus giving a yield of 27.% from the cholesteryl benzoate.

It can thus be seen that by employing the process of my invention an increase in yield of 25.3% was obtained as compared to the yield when the process of the prior art was employed. Even more striking, however, was the fact that the purity of the crude product obtained by the process of my invention was 172% greater than the purity of the product obtained by the prior art process. In addition to the substantial increase in yield obtained and the tremendous increase in purity of the product obtained when the process of my invention was employed as compared to the yield and purity obtained when the process of the prior art was employed, the process of the present invention also required much less time and fewer steps to recover the crude 7-dehydrocholesteryl benzoate from the dehydrohalogenation reaction mixture than did the prior art process. A further disadvantage of the prior art processes is that in addition to the crude ester usually having a relatively low purity, the impurities in the crude ester so obtained are such as to make it difficult to obtain the free 7-dehydrosterol from the crude ester in any substantial degree of purity without losing a considerable amount of valuable 7-dehydrosterol in the process. However, crude esters obtained by the process of my invention may readily be further treated to obtain the free 7-dehydrosterol in a high degree of purity without any substantial loss of 7-dehydrosterol.

In order to more strikingly point out the superiority of my process over the prior art processes, the following representative flow sheet diagrams of the prior art processes and of the process of my invention are presented:

*Prior art*

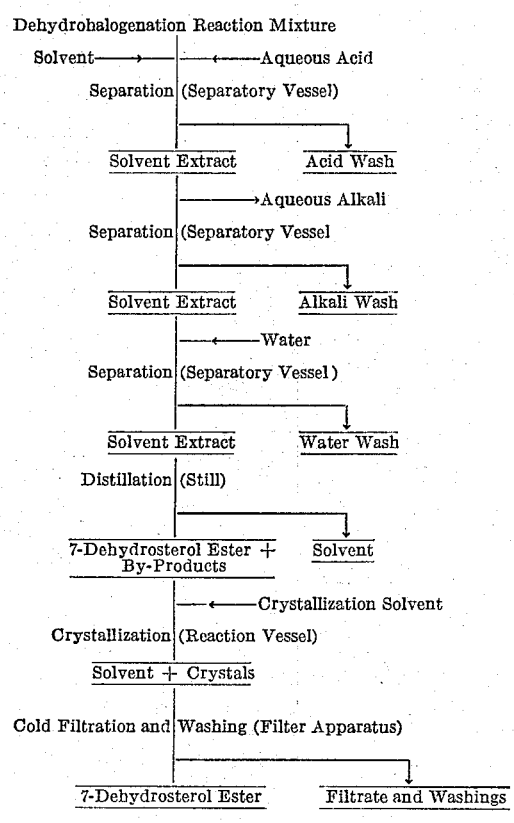

*Process of present invention*

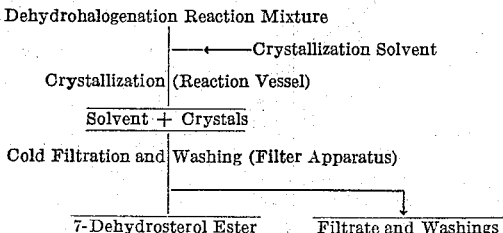

In the above flow sheet diagram representing the prior art processes, the last two steps which are shown, i. e. the step of crystallizing the 7-dehydrosterol ester after separation thereof from the dehydrohalogenating agent and the step of recovering the crystallized ester, have not always been carried out by workers in the prior art. It has been found, however, when operating in accordance with the prior art procedures using crude non-crystallized materials for irradiation and conversion to vitamin $D_3$ that a number of practical difficulties arise. The surface of the quartz irradiation vessels become covered with an opaque film and the process of irradiation must be frequently interrupted to clean the surface. Furthermore, the conversion to vitamin $D_3$ is substantially lower than when a purified 7-dehydrocholesterol is employed. Thus, for practical reasons it has been found desirable to recrystallize and purify the crude non-crystallized products of the prior art processes before subjecting the material to the irradiation process. Obviously a further advantage of purifying the crude 7-dehydrosterol ester is that the vitamin $D_3$ product ultimately obtained is of a higher degree of purity and hence more suitable for the preparation of vitamin $D_3$ concentrates for animal and human consumption.

From the above description and examples it is evident that my invention provides a highly improved process for the recovery of 7-dehydrosterol esters from the dehydrohalogenation reaction mixtures in which they are formed. Although the detailed illustrative examples given above all show the recovery of esters of 7-dehydrocholesterol, it is to be definitely understood that the process of my invention is not limited to the recovery of esters of 7-dehydrocholesterol. The process of my invention is quite applicable to the recovery of esters of 7-dehydrosterols prepared from any of the sterols referred to in the British patent, the French patent or the U. S. patent application referred to hereinabove, or from any other sterol of the same general characteristics.

The use of hydrocarbon solvents in isolating and recovering the 7-dehydrosterol esters following dehydrohalogenation of halogenated sterol esters, and the advantages of such use are more fully disclosed and claimed in the copending application of David H. Gould, Serial No. 21,099, filed April 14, 1948.

Having described my invention, what I claim as new and desire to secure by Letters Patent is:

1. A process for recovering a 7-dehydrosterol ester from the dehydrohalogenation reaction mixture in which it is formed which comprises dissolving the dehydrohalogenation reaction mixture in an excess of a solvent selected from the group consisting of aliphatic alcohols, ketones, and esters containing not more than five carbon atoms and of mixtures of such solvents, cooling the resulting solution to a temperature somewhat below room temperature, and removing therefrom the 7-dehydrosterol ester which separates from the cooled solution.

2. A process for recovering a 7-dehydrocholesterol ester from the dehydrohalogenation reaction mixture in which it is formed which comprises dissolving the dehydrohalogenation reaction mixture in an excess of a solvent selected from the group consisting of aliphatic alcohols, ketones, and esters containing not more than five carbon atoms and of mixtures of such solvents, cooling the resulting solution to a temperature somewhat below room temperature, and removing therefrom the 7-dehydrocholesterol ester which separates from the cooled solution.

3. A process for recovering a 7-dehydrosterol ester from the dehydrohalogenation reaction mixture in which it is formed which comprises dissolving the dehydrohalogenation reaction mixture in an excess of an aliphatic alcohol containing not more than five carbon atoms, cooling the resulting solution to a temperature somewhat below room temperature, and removing therefrom the 7-dehydrosterol ester which separates from the cooled solution.

4. A process for recovering a 7-dehydrocholesterol ester from the dehydrohalogenation reaction mixture in which it is formed which comprises dissolving the dehydrohalogenation reaction mixture in an excess of an aliphatic alcohol containing not more than five carbon atoms, cooling the resulting solution to a temperature somewhat below room temperature, and removing therefrom the 7-dehydrocholesterol ester which separates from the cooled solution.

5. A process for recovering a 7-dehydrosterol ester from the dehydrohalogenation reaction mixture in which it is formed which comprises dissolving the dehydrohalogenation reaction mixture in an excess of ethanol, cooling the resulting solution to at least 10° C., and removing therefrom the 7-dehydrosterol ester which separates from the cooled solution.

6. A process for recovering a 7-dehydrosterol ester from the dehydrohalogenation reaction mixture in which it is formed which comprises dissolving the dehydrohalogenation reaction mixture in an excess of methanol, cooling the resulting solution to at least 10° C., and removing therefrom the 7-dehydrosterol ester which separates from the cooled solution.

7. A process for recovering a 7-dehydrosterol ester from the dehydrohalogenation reaction mixture in which it is formed which comprises dissolving the dehydrohalogenation reaction mixture in an excess of a mixture of methanol and acetone, cooling the resulting solution to at least 10° C., and removing therefrom the 7-dehydrosterol ester which separates from the cooled solution.

8. A process for recovering a 7-dehydrocholesterol ester from the dehydrohalogenation reaction mixture in which it is formed which comprises dissolving the dehydrohalogenation reaction mixture in an excess of ethanol, cooling the resulting solution to at least 10° C., and removing therefrom the 7-dehydrocholesterol ester which separates from the cooled solution.

9. A process for recovering a 7-dehydrocholesterol ester from the dehydrohalogenation reaction mixture in which it is formed which comprises dissolving the dehydrohalogenation reaction mixture in an excess of methanol, cooling the resulting solution to at least 10° C., and removing therefrom the 7-dehydrocholesterol ester which separates from the cooled solution.

10. A process for recovering a 7-dehydrocholesterol ester from the dehydrohalogenation reaction mixture in which it is formed which comprises dissolving the dehydrohalogenation reaction mixture in an excess of a mixture of methanol and acetone, cooling the resulting solution to at least 10° C., and removing therefrom the 7-dehydrocholesterol ester which separates from the cooled solution.

11. A process for recovering a 7-dehydrocholesterol ester from the dehydrohalogenation reaction mixture in which it is formed which comprises dissolving the hot dehydrohalogenation reaction mixture in at least twice its volume of hot ethanol, cooling the resulting solution to at least 10° C., and removing therefrom the 7-dehydrocholesterol ester which separates from the cooled solution.

12. A process for recovering a 7-dehydrocholesterol ester from the dehydrohalogenation reaction mixture in which it is formed which comprises dissolving the hot dehydrohalogenation reaction mixture in at least twice its volume of hot methanol, cooling the resulting solution to at least 10° C., and removing therefrom the 7-dehydrocholesterol ester which separates from the cooled solution.

WILLIAM L. RUIGH.

REFERENCES CITED

The following references are of record in the file of this patent:

UNITED STATES PATENTS

| Number | Name | Date |
|---|---|---|
| 1,912,440 | Frey | June 6, 1933 |
| 2,441,091 | Vliet | May 4, 1948 |

FOREIGN PATENTS

| Number | Country | Date |
|---|---|---|
| 574,432 | Great Britain | Jan. 4, 1946 |